Nov. 13, 1928.

E. F. MAAS 1,691,772

ALIGNING DEVICE

Filed May 23, 1925   2 Sheets-Sheet 1

INVENTOR
Elov F. Maas,
BY
ATTORNEY

Nov. 13, 1928.  
E. F. MAAS  
ALIGNING DEVICE  
Filed May 23, 1925  
1,691,772  
2 Sheets-Sheet 2

INVENTOR  
*Elov F. Maas,*  
BY  
ATTORNEY

Patented Nov. 13, 1928.

1,691,772

UNITED STATES PATENT OFFICE.

ELOV F. MAAS, OF AKRON, OHIO, ASSIGNOR TO THE GOODYEAR TIRE & RUBBER COMPANY, OF AKRON, OHIO, A CORPORATION OF OHIO.

ALIGNING DEVICE.

Application filed May 23, 1925. Serial No. 32,433.

My invention relates to a method of and apparatus for building bands for pneumatic tires and it is particularly directed to a method of superposing a plurality of continuous strips of material to form a band prior to its incorporation in a tire carcass.

One object of my invention is to provide a device which will superimpose a plurality of plies in exact alignment.

In my copending application Serial Number 25,554 I have described a method and machine for continuously superposing a plurality of strips of rubberized fabric to form a band which may be utilized in constructing pneumatic tires. In the machine described in the copending application, it is necessary for the operator to adjust the continuous strips of fabric manually in order that they may be stitched in neat alignment. According to my present invention, I have provided a method of and a machine for accomplishing this operation automatically.

Figure 1:
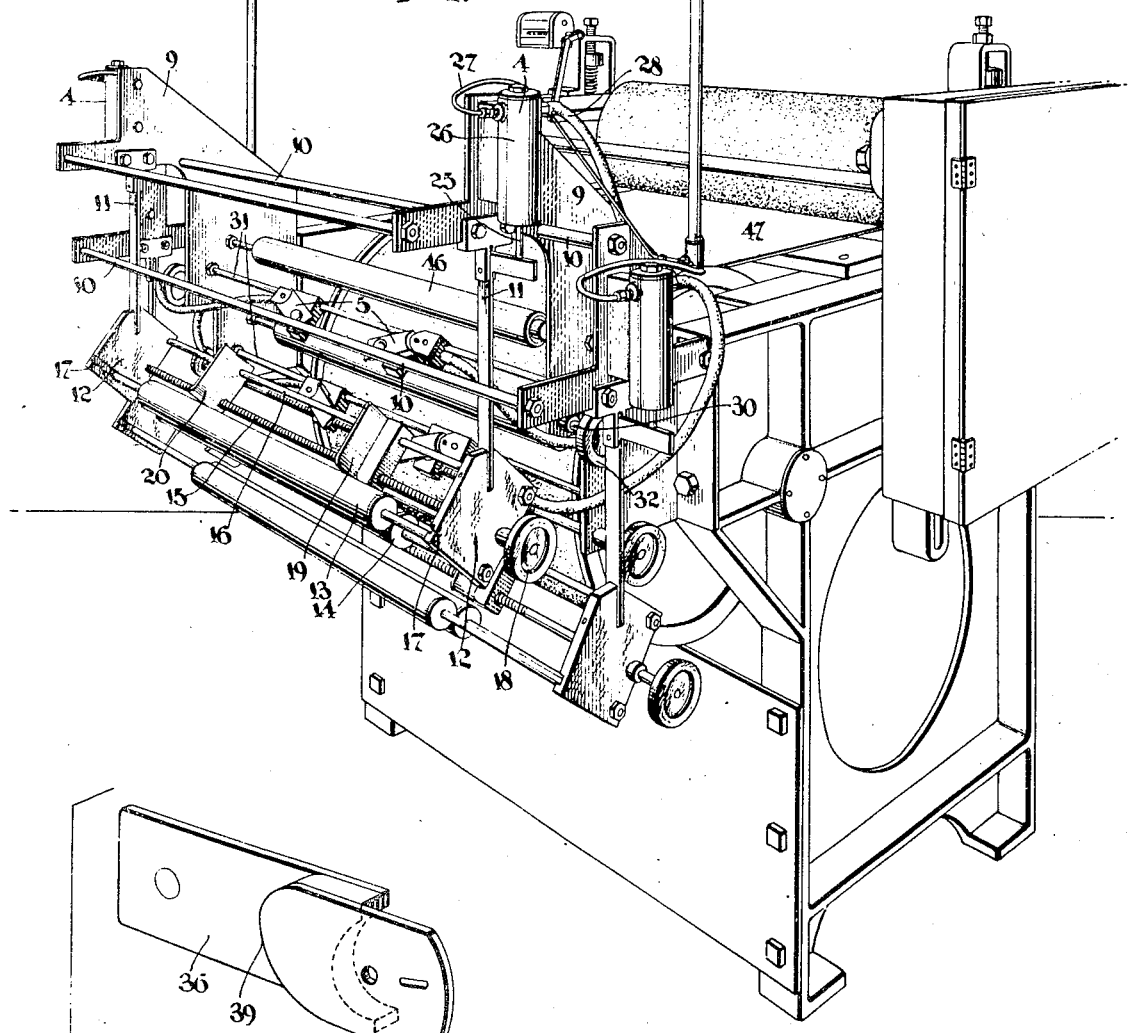
Fig. 1 is a perspective view of a device constructed in accordance with the principles of my invention.
Figure 4:
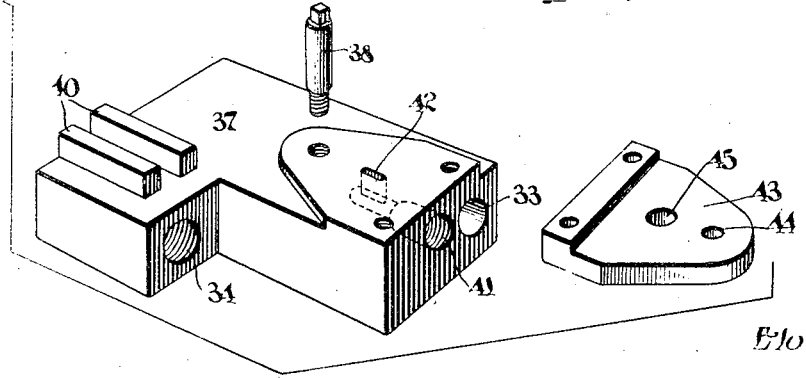
Fig. 4 illustrates the parts embodied in the valve control device.

Inasmuch as the means for guiding individual sheets 1 and 2 are identical, only one will be described. It consists of a frame 9, maintained in parallel alignment by a plurality of cross-members 10. The former supports a guide device 3 which is actuated by pneumatically operated piston mechanisms or expansible devices 4 that, in turn, are controlled from engaging valve mechanisms 5.
In operating the machine. the valves react in accordance with the relative position of the sheet, and thereby actuate the guide mechanism 3 by means of the piston devices 4.

The guide mechanism is suspended in pivotal relation with the frame 9 by a plurality of members 11 of L-shape. It includes oppositely disposed end members 12 which support a plurality of rotatable rolls 13 and 14, and parallel cross-members 15 and 16. The cross member 15 is rotatably mounted at its ends in the end member 12 while the ends of the cross-member 16 are secured rigidly thereto, thereby retaining the members 12 in parallel spaced relation. The roll 13, being mounted in slots 17 in the members 12, is maintained by its own weight in engagement with the roll 14. The member 15 is provided with oppositely screw-threaded portions and has an operating knob 18 secured thereto. Two guide members 19 and 20, in slidable relation with the cross-member 16, are adapted to be moved simultaneously in opposite directions by rotation of the rod 15.

The horizontally extended portion of the L-shaped member 11 is in engagement with a piston rod 25 and is actuated thereby. The rod 25 reciprocates in a cylinder 26 which is rigidly mounted on the frame and is in communication with an air supply by a conduit 27 and with the valve mechanism 5 by means of a flexible tube 28. The cylinders are fed from a constant pressure air supply through orifices of restricted area. The exhaust openings of the mechanisms 5 on the other hand are relatively large and are connected to the piston by the tube 28.

The valve mechanisms 5 are mounted on a plurality of cross-members 30 and 31 held in alignment by the frame. The rod 30 is provided with a handle 32 and a threaded surface identical with that described in connection with the guide device. The mechanisms are free to slide on the upper rod 31 which passes through an opening 33 provided therefor while the threaded rod meshes with threaded walls of an opening 34 in the lower portion thereof.

The valve mechanism consists of a weighted leaf 36 which serves as a follower, is pivoted to a metal block 37 by means of a pin member 38. The fabric engages a shoulder portion 39 of the leaf and causes it to respond proportionally with the force applied thereto. In addition, the block member is provided with an opening 41 which communicates with the upper surface through a slot 42 and also a pair of integral lugs 40 adapted to retain a reinforced soapstone rod 48, over which the sheet passes. A recessed cover plate 43 is bolted over the valve opening so as not to impede the movement of the leaf. Openings 44 and 45 are provided therein for reception of the pin 38 and to provide a passage for the air, which is allowed to exhaust when the slot in the leaf and that in the block coincide.

The valve blocks may be adjusted horizontally, but are always inclined at the same angle, as will be apparent from Fig. 1. In the position there shown, the leaf member is at its lowest point of inclination. During the operation of the device, however, the friction caused by the contact between the edge of the fabric and the shoulder member pivots the members upwardly.

Figure 2:
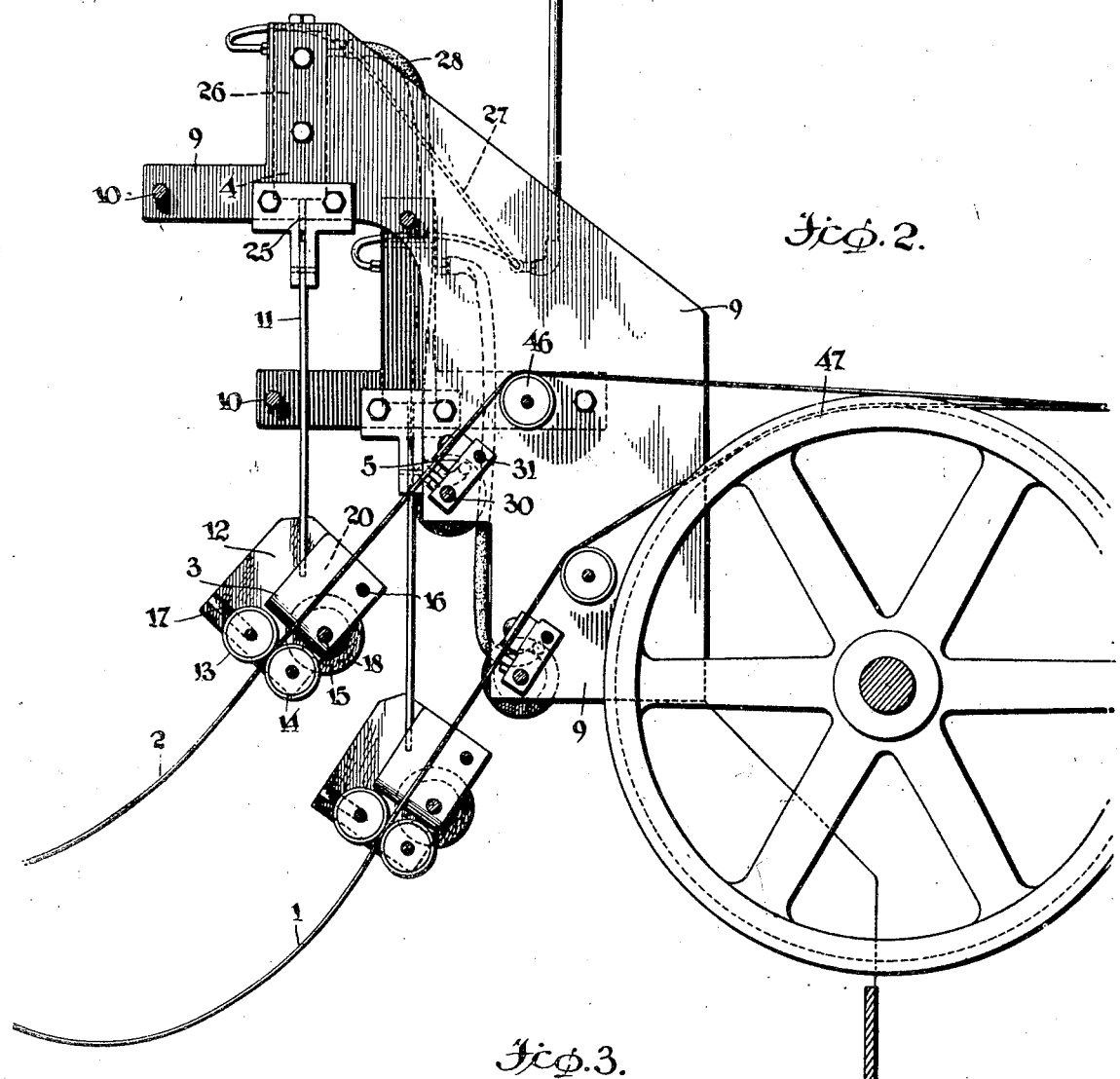
Fig. 2 is a side view of the device shown in Fig. 1 and shows, diagrammatically, a plurality of fabric sheets being aligned in accordance with the principles of the invention.
Figure 3:
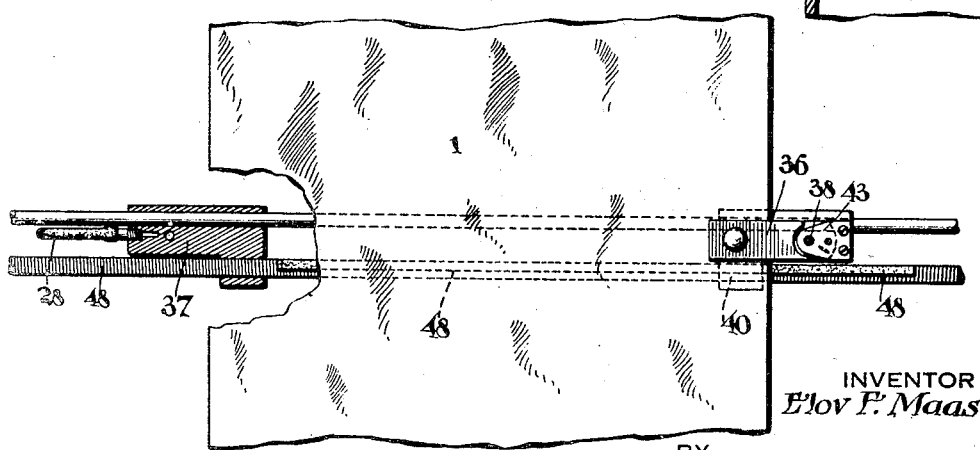
Fig. 3 is a plan view of a control valve in operative relation with a sheet and a sectional view of its complement.

In practicing the invention, the fabric is caused to move between the rolls 13 and 14 and the properly adjusted guides 19 and 20, as illustrated in Fig. 2. The fabric is then threaded over the soapstone rod 48 and between the block and the leaf member of the valve mechanisms 5, before passing over a single roll 46 to a stitching table 47. It will be apparent that only when there is insufficient friction between the shoulder 39 and the fabric will the leaf member drop into the position shown in Fig. 1. It will be appreciated, of course, that the positions shown there are abnormal in that there is no fabric present. In order to have any one of the valves in a position, such as illustrated in Fig. 1, the fabric must have receded from the shoulder with which it is normally in contact. In such case, the slots in the valve are in alignment and the air is thereby allowed to exhaust to the atmosphere. Thereupon, the pressure in the cylinder 26 connected to that valve is reduced and the piston in the other cylinder overcomes the force supplied by the piston having a low pressure.

The distance between the valves should be such that the opposite edges of the sheet are in contact with the shoulders of the valve leaf and such adjustment is initially secured by operation of the rod 30. Under these conditions, the pivoted members of the valve are substantially parallel when the fabric is in exact alignment. If it should waver, however, the leaf on the receded side pivots downwardly. But inasmuch as the friction must be increased on the opposite side, the leaf of that valve is pivoted upwardly. As has been described above, the air pressure in the cylinder, which is in communication with the valve whose leaf is in a downward position, is reduced, and the force of the piston is thereby materially lessened. It follows then that the force supplied by the oppositely disposed piston overcomes that furnished by the reduced pressure and the pivotally suspended guide member is caused to swing in such direction as to correct the lateral movement of the sheet material.

It is to be noted that the guide members are positioned in a manner analogous to that employed in the case of the valves, that is, the parallel members should just come in contact with the edges of the sheet. In adjusting a unit embodying a plurality of individual centering means, some arbitrary plane of reference should be chosen by which all may be brought into common alignment.

The unit illustrated, provides for centering two separate sheets. It will be realized of course that any number may be accommodated. It will also be realized that while I have specifically designated compressed air as the control medium, any pressure fluid may be substituted therefor with only minor modifications. Likewise, any suitable means of electrical communications may be employed. In the description I have referred to the contact made by the sheet with the valve leaf as a frictional engagement. Successful operation of the device may perhaps also depend somewhat for the necessary traction, on the adhesive properties of the rubberized fabric.

While I have described but a single embodiment involving the application of the principles of my invention, it will be apparent to those skilled in the art that the invention is not so limited, and I desire, therefore, that it should be construed in accordance with prior art and the appended claims.

What I claim is:

1. A machine for disposing a plurality of fabric sheets in superposed alignment including a frame, a plurality of guide members, movably mounted on the frame, a plurality of valves having arm members operated by frictional contact with the edges of the fabric, and a pair of pistons controlled by the valves for actuating the guide members.

2. In a machine for disposing a plurality of fabric sheets in superimposed alignment, a frame having movable guide members mounted thereon, a piston operatively associated with the frame for moving the guide members and means for controlling the displacement of the piston comprising a valve operated by lateral movement of the sheet with which it is in engagement whereby the differential pressure acting upon the piston is regulated.

3. A device for guiding a moving sheet of material comprising a frame, a guide member, pneumatically operated means for moving the guide member and means for regulating the movement of the guide comprising a pivotable valve-arm adapted to engage the edge of the sheet and be actuated thereby.

4. A device for guiding a moving sheet of material comprising a frame, a guide member, pneumatically operated means for moving the guide member and a plurality of means for regulating the movement of the guide, each comprising a pivotable valve-arm having a shoulder portion in engagement with the edge of the sheet material and actuated by frictional contact therewith.

5. A device for guiding a moving sheet comprising transversely extending means for supporting the sheet, guide members for maintaining the sheet in substantially a predetermined position upon the means and means responsive to the lateral position of the sheet adjacent the first means for controlling the lateral position of the latter.

6. A device for guiding a moving sheet comprising a fluid control valve, an actuating member therefor adapted to be frictionally entrained by the edge of the moving sheet and fluid pressure operated means controlled by the valve for changing the position of the sheet in response to the movement of the actuating member.

7. A device for guiding a moving sheet comprising a frame, means movably mounted on the frame for supporting the sheet, expansible devices operatively associated with the frame and the supporting means for moving the latter, and means movable with the sheet by frictional engagement therewith for controlling the operation of the expansible devices.

In witness whereof, I have hereunto signed my name.

ELOV F. MAAS.